US012606293B2

(12) United States Patent
　　Bories

(10) Patent No.: US 12,606,293 B2
(45) Date of Patent: Apr. 21, 2026

(54) MECHANISM FOR LOCKING AIRCRAFT DOOR HANDLES WITH LATERAL ESCAPE OF THE STOPS

(71) Applicant: LATECOERE, Toulouse (FR)

(72) Inventor: Xavier Bories, Toulouse (FR)

(73) Assignee: LATECOERE, Toulouse (FR)

( * ) Notice: Subject to any disclaimer, the term of this patent is extended or adjusted under 35 U.S.C. 154(b) by 29 days.

(21) Appl. No.: 18/712,793

(22) PCT Filed: Nov. 18, 2022

(86) PCT No.: PCT/EP2022/082513
　　§ 371 (c)(1),
　　(2) Date: May 23, 2024

(87) PCT Pub. No.: WO2023/094289
　　PCT Pub. Date: Jun. 1, 2023

(65) Prior Publication Data
　　US 2025/0019061 A1　　Jan. 16, 2025

(30) Foreign Application Priority Data
　　Nov. 26, 2021　　(FR) ...................................... 2112559

(51) Int. Cl.
　　B64C 1/14　　　　(2006.01)
(52) U.S. Cl.
　　CPC ................................... B64C 1/143 (2013.01)
(58) Field of Classification Search
　　CPC ................................................... B64C 1/143

USPC ........................................................ 292/336.3
See application file for complete search history.

(56) References Cited

U.S. PATENT DOCUMENTS

| | | | | | |
|---|---|---|---|---|---|
| 4,453,684 A | * | 6/1984 | Hanks | ...................... | B64C 1/24 |
| | | | | | 105/430 |
| 4,470,566 A | * | 9/1984 | Fitzgerald | ............... | B64C 1/143 |
| | | | | | 292/201 |
| 4,487,440 A | * | 12/1984 | Beijer | ..................... | E05B 5/003 |
| | | | | | 292/DIG. 31 |

(Continued)

FOREIGN PATENT DOCUMENTS

| | | |
|---|---|---|
| CN | 106677612 | 5/2017 |
| FR | 3087189 | 4/2020 |
| WO | WO2020253985 | 12/2020 |

*Primary Examiner* — Nathan Cumar
(74) *Attorney, Agent, or Firm* — Defillo & Associates, Inc.; Evelyn A. Defillo

(57) ABSTRACT

A mechanism for locking an actuating handle of an aircraft door having laterally releasing stops and opens by circular translation, the door having a pivoting maneuvering arm coupled to a forearm articulated on the door and handle, in a plane parallel to the arm pivoting plane, between a closed position of the door and an end-of-travel position corresponding to partial opening thereof after releasing the stops, includes at least one peg borne by the handle and at least one guideway with a circular profile and borne by the arm face, the face arranged facing the peg and centered on the hinge, the peg and guideway being relatively positioned so, in the end-of-travel position of the handle corresponding to the end of the stops releasing and during the circular translation of the door until is fully open, the rotation of the handle is blocked by contacting the peg against the guideway.

11 Claims, 6 Drawing Sheets

(56)     References Cited

U.S. PATENT DOCUMENTS

| | | | | | |
|---|---|---|---|---|---|
| 4,560,123 | A | * | 12/1985 | Sealey | B64C 1/143 |
| | | | | | 244/129.5 |
| 4,758,030 | A | * | 7/1988 | Kupfernagel | B64C 1/1415 |
| | | | | | 292/29 |
| 4,854,010 | A | * | 8/1989 | Maraghe | E05D 3/18 |
| | | | | | 49/248 |
| 5,156,359 | A | * | 10/1992 | Noble | E05B 5/003 |
| | | | | | 292/DIG. 31 |
| 9,327,820 | B2 | * | 5/2016 | Lamat | E05B 65/10 |
| 9,816,307 | B2 | * | 11/2017 | Bessettes | E05F 11/54 |
| 11,512,512 | B2 | * | 11/2022 | Means | E05D 7/009 |
| 2006/0202087 | A1 | * | 9/2006 | Mortland | B64C 1/1407 |
| | | | | | 244/129.5 |
| 2015/0337570 | A1 | * | 11/2015 | Powell | E05B 63/14 |
| | | | | | 292/336.3 |
| 2018/0273156 | A1 | * | 9/2018 | Vergnot | B64C 1/1461 |
| 2020/0070947 | A1 | * | 3/2020 | Heeren | B64C 1/1423 |
| 2020/0317320 | A1 | * | 10/2020 | Gormley | B64C 1/14 |
| 2021/0070416 | A1 | * | 3/2021 | Buchet | B64C 1/143 |
| 2021/0179253 | A1 | * | 6/2021 | Romec | B64C 1/1461 |
| 2021/0206465 | A1 | * | 7/2021 | Louvel | B64C 1/14 |
| 2021/0261233 | A1 | * | 8/2021 | Molinari | B64C 1/1407 |
| 2021/0323654 | A1 | * | 10/2021 | Gildas | E05D 3/147 |
| 2021/0323655 | A1 | * | 10/2021 | Gildas | B64C 1/1461 |
| 2021/0332624 | A1 | * | 10/2021 | Means | E05D 7/009 |
| 2021/0381285 | A1 | * | 12/2021 | Hummer | E05B 79/06 |

* cited by examiner

Figure 7

MECHANISM FOR LOCKING AIRCRAFT DOOR HANDLES WITH LATERAL ESCAPE OF THE STOPS

CROSS REFERENCE TO RELATED APPLICATION

This application is a National Stage Entry of PCT/EP2022/082513 filed Nov. 18, 2022, under the International Convention and claiming priority over French Patent Application No. FR2112559 filed Nov. 26, 2021.

FIELD OF THE INVENTION

The invention relates to a mechanism intended to lock and/or block the handles of an aircraft door arranged in a fuselage opening and provided with lateral-release stops. The invention also relates to an aircraft door equipped with this mechanism, to a method for opening this door and to an aircraft provided with such a door.

More particularly, this invention applies to handles of what are referred to as "semi-plug" aircraft doors, i.e. doors that are capable of passing through their frame when they are being opened and closed.

BACKGROUND OF THE INVENTION

Aircraft fuselages are generally provided with openings that are closed off by doors equipped with one or more actuating handles and with systems that are intended to close these openings in a safe and sealed manner while being quick and straightforward for the flight crew to maneuver.

Furthermore, the resistance of the door to the pressure difference between the inside and the outside of the cabin of the aircraft is advantageously realized by means of stops installed both on peripheries of the door and at the periphery of its fuselage frame, these stops engaging with one another.

Of the various existing systems for opening/closing an aircraft door, the invention relates more particularly to the system referred to as having laterally releasing stops, which is described, in particular, in the patent document FR1859376.

This system allows, in a first step, the door to be pivoted about a virtual axis passing through its vertical median, which causes the lateral stops to leave their housing in the frame. Then, in a second step, this pivoting continues while being accompanied by a phase of circular translation (referred to as "swiveling") in a horizontal plane coincident with the plane of the releasing movement of the stops. This translation brings the door into its final wide-open position in which its internal face still faces the fuselage.

Thus, with such a system, the kinematics of the movements of the door with respect to the fuselage occur, from its frame, in a horizontal main plane defined by at least one handling arm connected to the frame and coupled, via a hinge, to an articulated forearm on the door.

Furthermore, the door comprises a pin that allows an actuating handle to rotate, in a plane parallel to the pivoting plane of the arm, between a closed position of the door and an end-of-travel position corresponding to partial opening thereof.

The kinematics of the arm can also be broken down into two entirely distinct phases: a complex first phase while the stops are released laterally, followed by a second phase of simple rotation during the circular translation of the door, during which the handle has to remain in a fixed position with respect to the door in order to avoid any harmful interaction with the displacement of the door. Specifically, if the handle is turned while the door is in its circular-translation phase, there is a risk of the mechanism of the door becoming desynchronized and potentially preventing reclosure, or even causing the door to collide with the fuselage since, because the forearm is unblocked, the door will become offset and will no longer be parallel to the fuselage.

However, since the kinematics of the door consist of displacement from its frame toward the outside of the fuselage, i.e. from the rear to the front, the shaft that is connected to the handle remains within the inner limits of the door and therefore cannot be blocked by a lever mechanism that would restrict it by being connected to the frame. Specifically, during the stop-releasing phase, the door is offset toward the outside and is therefore already no longer aligned with the fuselage.

Document US 2021/0332624 describes an aircraft door arm, this arm being equipped with a simplified opening mechanism having a guide cam that enables lateral opening with circular translation of the door.

SUMMARY OF THE INVENTION

In this context, the main objective of the invention is to block or immobilize the actuating handles of an aircraft door that has laterally releasing stops by means of a specific locking mechanism that makes it possible to maintain the handles in an end-of-travel position from the end of the stop-release phase and throughout the pivoting of the door during its circular translation and without subjecting its main shaft to stresses.

This aim is achieved, according to the invention, by means of a mechanism for locking at least one actuating handle of an aircraft door that has laterally releasing stops and opens by circular translation, said door being mounted in a frame of the fuselage and being provided, on the one hand, with a maneuvering arm that is mounted so as to pivot on the frame and coupled, via a hinge, to a forearm that is articulated via a first pin on the door and, on the other hand, with a second pin that allows said handle to rotate, in a plane parallel to the pivoting plane of the arm, between a closed position of the door and an end-of-travel position corresponding to partial opening of the door after the stops have been released. In this mechanism, at least one peg is borne by said handle and at least one guideway that has a circular profile is borne by a face of said arm, said face being arranged facing the peg and centered on said hinge, the peg and the guideway being relatively positioned such that, from the end-of-travel position of the handle corresponding to the end of the stops releasing and during the circular translation of the door until it is fully open, the rotation of the handle is blocked by bearing contact of the peg against the guideway.

According to one advantageous feature of the mechanism of the invention, the circular profile of the guideway has a diameter that is within a range of values and, from the intermediate angular pivoting position of the arm, causes the potential path of the peg to be cut off by the guideway, in the event of an action applied to the handle.

According to another feature of the invention, the peg is arranged between the pin of the hinge and the pin of the handle.

According to a first variant embodiment of the invention, the handle bears a single peg that engages with a single guideway having a length that is greater than or equal to the angular travel of the arm between the end of the stops releasing and the door being fully open.

According to another variant embodiment of the invention, the handle bears a peg referred to as outer peg and a peg referred to as inner peg, which are arranged laterally on either side of the handle and engage, respectively, with a convex face of a guideway referred to as outer guideway and a concave face of a guideway referred to as inner guideway, said guideways being borne by the arm.

In this case, the inner guideway has a greater radius than that of the outer guideway.

The radius difference between the two functional surfaces of the guideways is greater than or equal to the diameter of the pegs plus the chosen clearance between the peg and guideway. The two guideways have to be realized so as to always have at least one peg facing a guideway (the concave inner guideway being active first), while leaving the passage free for the possible second peg during the initial stop-releasing phase.

According to one specific variant embodiment, each guideway is delimited by a lateral wall of a rib with an at least partially cylindrical profile and this rib extends around the periphery of the end of the arm.

Furthermore, the length of the two guideways combined (or the length of the single guideway in the variant with a single peg) is greater than or equal to the angular travel of the arm during the circular-translation phase of the door.

According to yet another variant of the invention, the locking mechanism comprises a base that supports at least one guideway and the profile of which substantially conforms to the contours of the end of the arm to which said base is attached.

Yet another subject of the invention is an aircraft door comprising a set of lateral-release stops, at least one maneuvering arm that is mounted so as to pivot in a frame formed in the fuselage and coupled, via a hinge, to a forearm that is articulated on the door and, on the other hand, with a pin that allows at least one handle to rotate, in a plane parallel to the pivoting plane of the arm, between a closed position of the door and an end-of-travel position corresponding to partial opening, and a mechanism for locking the handle having the features defined above.

One application of the subject of the invention is an aircraft having at least one door that has laterally releasing stops as defined above.

A final subject of the invention is a method for reversibly opening an aircraft door that has laterally releasing stops and is equipped with at least one actuating handle and with a mechanism as defined above for locking said handle. In this method, the handle is turned about its pin from its rest position corresponding to the closure of the door to its end-of-travel position corresponding to the end of the stop-releasing phase, then the arm is pivoted in a plane parallel to that of the handle in order to provide the circular translation of the door until it reaches its fully open position, the pegs facing, during this pivoting, the guideways in order to block any rotation of the handle.

The locking mechanism of the invention effectively blocks, using straightforward and economical means, the actuating handle throughout the circular-translation phase of the door after the stops have been released laterally.

The mechanism of the invention dispenses with any moving parts or other bearings and with any spring-type return means. As a result, the reliability is increased compared to the traditional technical solutions on account of there being no risk of such parts jamming or breaking. Furthermore, the saving in terms of mass provided by the invention is significant.

In addition, with the invention, there is no contact at all between the arm and the handle during the normal operation of opening the door, except in the event of the handle being actuated, intentionally or accidentally, during the circular translation of the door. In these conditions, the risk of the mechanism becoming worn is very low, or even non-existent.

Finally, the invention is self-sufficient and there is no longer any need to add parts to the frame of the door in order to block the actuating handle.

The invention can be applied to any type of door where the pin of the handle and the axis of the circular translation are parallel. Thus, the invention can be applied to any opening element, for example a hangar door, of any building or moving vehicle.

BRIEF DESCRIPTION OF THE FIGURES

Further information, features and advantages of the present invention will become apparent upon reading the following non-limiting description, with reference to the appended figures, which extend in a horizontal plane and in which, respectively:

FIG. 7 shows a partial top view of the door from FIG. 5 at the end of the circular-translation phase in its wide-open position;

DETAILED DESCRIPTION OF THE INVENTION

For greater clarity, identical or similar elements are denoted by the same reference signs throughout the figures.

Of course, the embodiments of the invention that are illustrated by the figures presented above and described below are given merely by way of non-limiting examples. Provision is explicitly made for different embodiments to be able to be proposed and combined with one another in order to propose other embodiments.

The invention relates to the field of aircraft doors and, in particular, to that of doors equipped with lateral stops (not shown in the figures) intended to provide mechanical strength upon mounting in the presence of the pressure differential prevailing, during flight, between the inside and the outside of the cabin.

Figure 1:
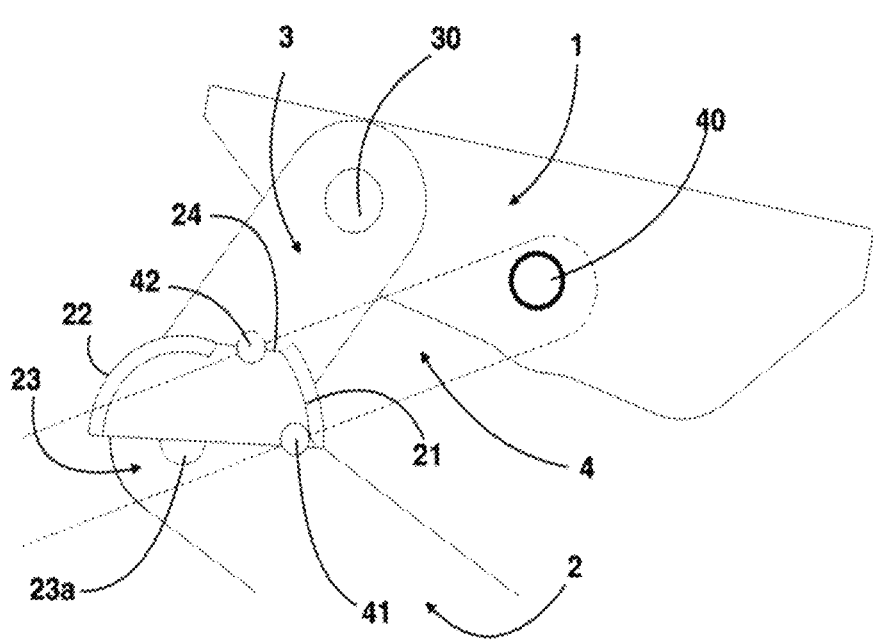
FIG. 1 shows a partial top view of the aircraft door according to the invention equipped with a preferred embodiment of the mechanism for locking the handle (shown as transparent) in the blocking position.
Figure 2:
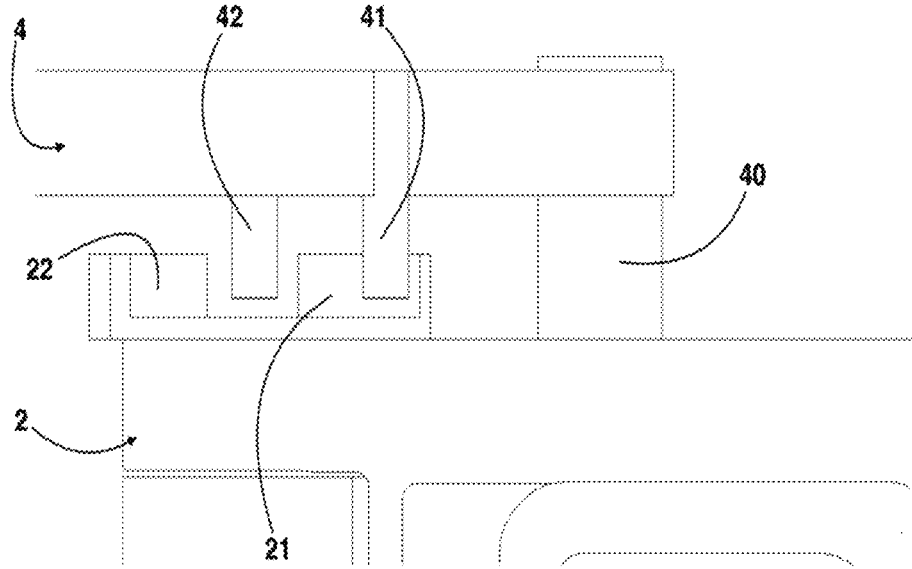
FIG. 2 shows a partial front view of the door from FIG. 1.
Figure 3:
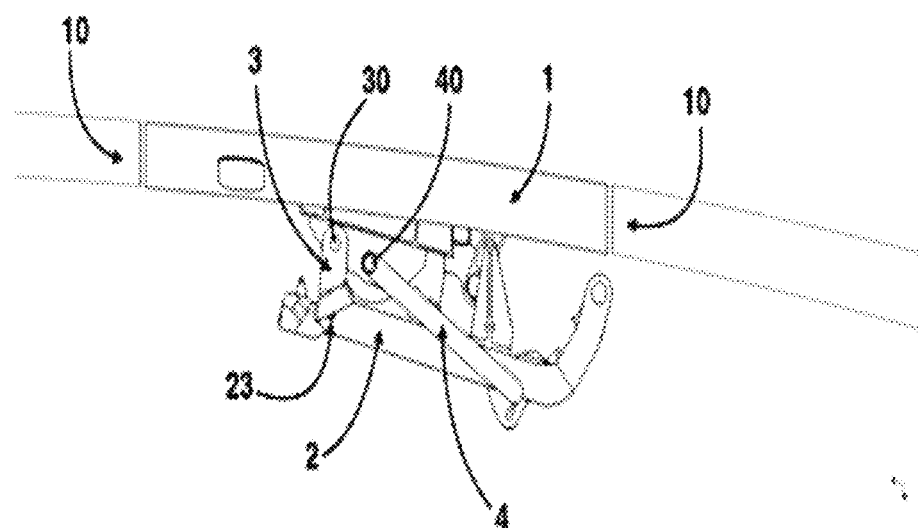
FIG. 3 shows a top view of the door from FIG. 1 in the closed position in its frame in the fuselage.
Figure 4:
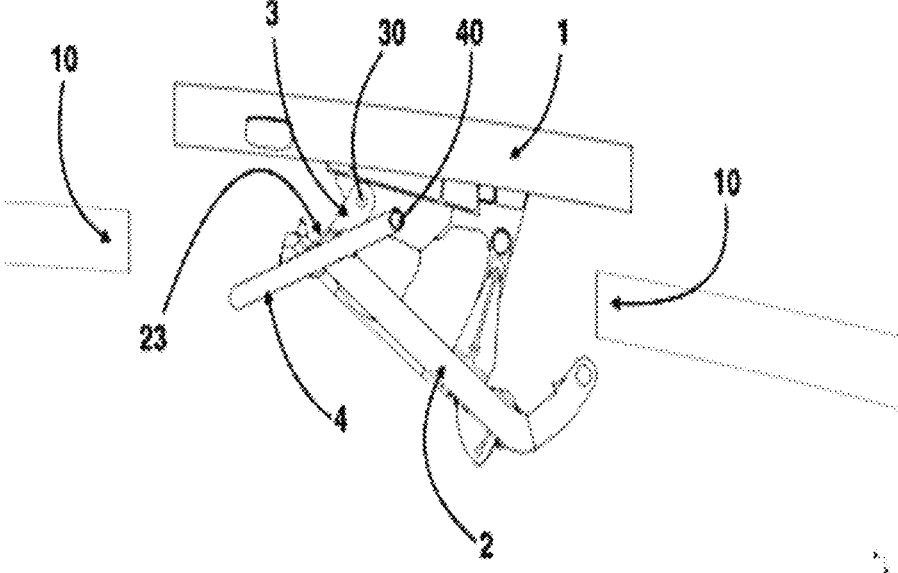
FIG. 4 shows a top view of the door from FIG. 3 in the released position at the end of the releasing phase of the lateral stops (not shown) with the handle at the end of travel.

As illustrated, in particular, by FIGS. 3 and 4, these doors 1 are mounted in frames 10, which are formed in the wall of the body of the fuselage, and are provided with a maneuvering arm 2 that is mounted so as to pivot on the frame 10 and coupled, via a hinge 23 with a pin 23a, to a forearm 3 that is articulated on the door 1 via a first pin 30, as illustrated by FIGS. 1 and 2.

Figure 5:
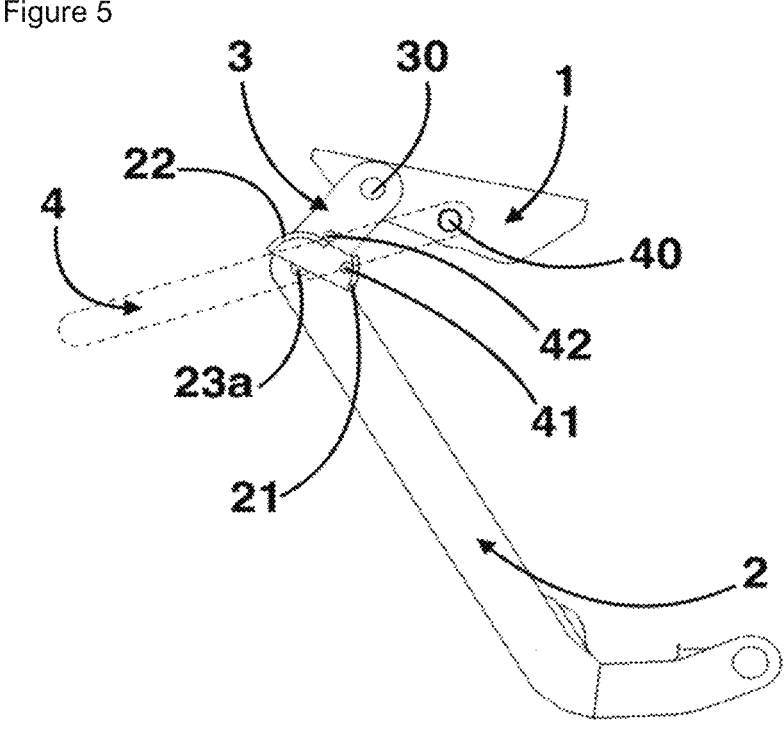
FIG. 5 shows a partial top view of the door from FIG. 1 at the start of the circular-translation phase after the stops have been released.
Figure 6:
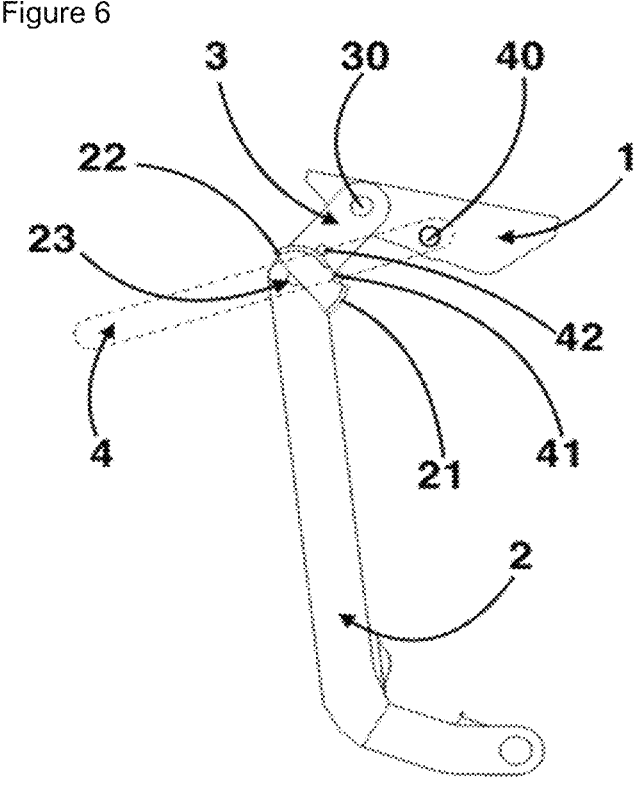
FIG. 6 shows a partial top view of the door from FIG. 1 during the circular-translation phase with the arm in an intermediate angular position.
Figure 7:
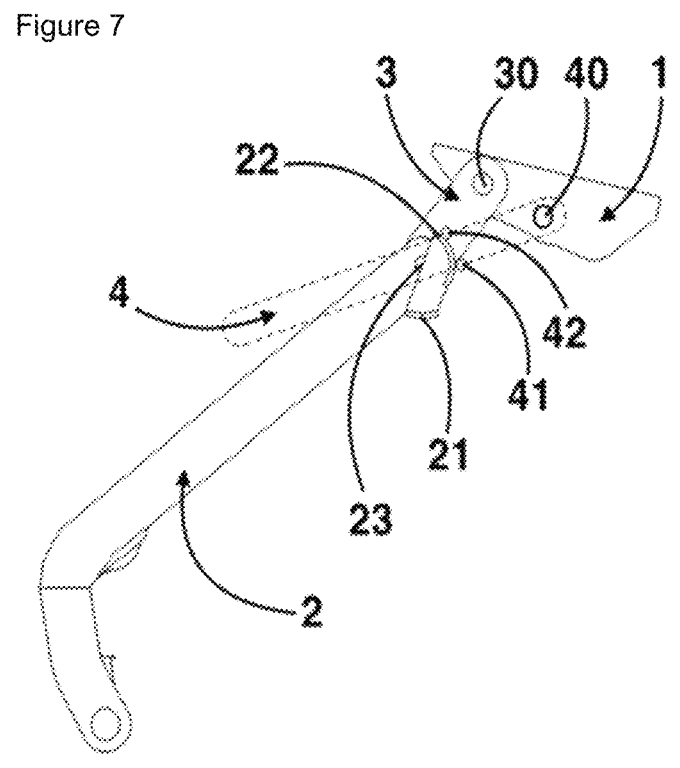

Thus, from an intermediate angular pivoting position of the arm 2, said position being shown in FIGS. 5 to 7 and situated after the end of the stops releasing, the door initiates circular translation about the pin 23a of the hinge.

The doors 1 support, furthermore, a second pin 40 that allows at least one actuating handle 4 (one inner handle and generally one outer handle) to rotate, in a plane parallel to the pivoting plane of the arm 2 (extending horizontally in this case) between a closed position of the door 1 (FIG. 3) and an end-of-travel position corresponding to the end of the stops releasing and to partial opening of the door (FIG. 4).

The kinematics of the arm 2, and therefore of the door 1, can be broken down into two entirely distinct phases. A first phase, which corresponds to the stops releasing laterally, is followed by a second phase of straightforward rotation accompanying the circular translation of the door, during which the handle 4 has to remain in a fixed position with respect to the door and with respect to the fuselage in order to avoid any harmful interaction with the free displacement of the door. In this position, the forearm 3 is blocked and the door remains parallel to the fuselage.

In order to obtain this result, the invention proposes equipping the door with a locking mechanism that ensures the handle 4 is blocked in its end-of-travel position during the circular-translation phase of the door.

This mechanism, which is shown in detail in FIGS. 1 and 2, comprises at least one peg 41 borne by the handle 4 and at least one circular guideway 21, the functional surface of which is concave and which is borne by the face of the arm 2, said face being arranged facing the peg 41 and centered on the pin 23a of the hinge 23.

In the embodiment shown in the figures, the locking mechanism comprises in this case a peg referred to as inner peg 41 and a peg referred to as outer peg 42, which are arranged laterally on either side of the handle 4 and engage, respectively, with a concave face of an inner guideway 21 and a convex face of an outer guideway 22, said guideways being borne by the arm 2. This solution with two pegs and two guideways makes it possible to secure the mechanism by having two peg-guideway pairs for blocking and immobilizing the handle 4, and makes the approach calculations easier for carrying out the engagements between the pegs and the respective guideways. However, these pegs are not intended to be active at the same time, in particular, the inner peg 41 alone blocks the handle at the start of the circular-translation phase of the door, whereas the outer peg 42 alone blocks at the end of this phase.

In a variant that is not shown in which the handle 4 bears only a single peg, the invention favors the presence of the single inner peg 41 and the single inner guideway 21, this pair adapting more directly to engagement.

Figure 8:
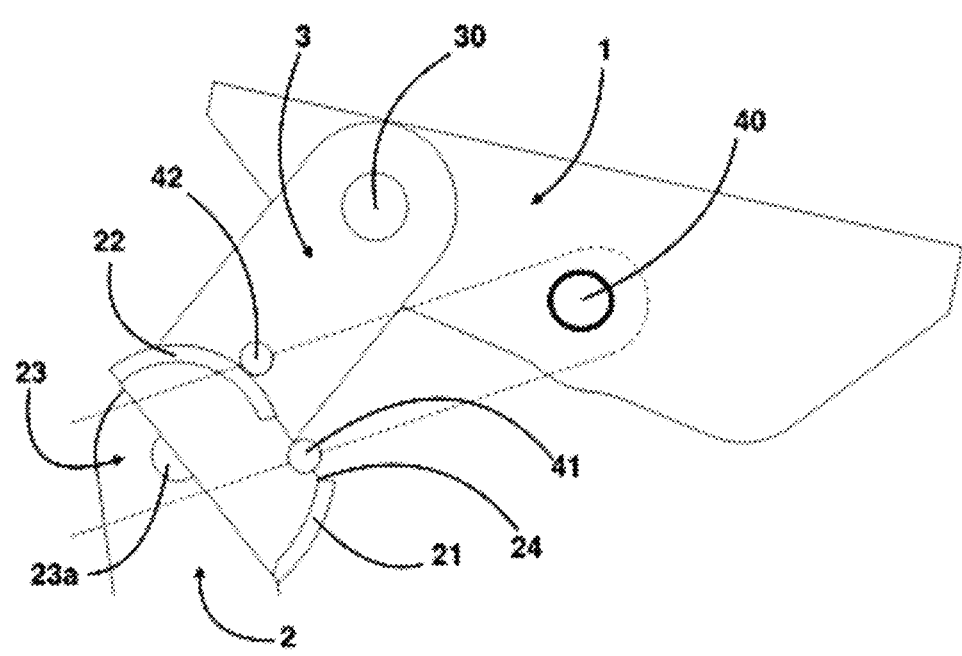
FIG. 8 shows a detailed top view of the locking mechanism of the invention in the position for blocking the handle illustrated by FIG. 6.

The pegs 41, 42 and the guideways 21, 22 are positioned such that, from the end-of-travel position of the handle 4 corresponding to the end of the stops releasing and during the circular translation of the door until it is fully open, the rotation of the handle 4 is blocked by bearing contact of the one or more pegs 41, 42 against the guideways 21, 22, as illustrated by FIG. 8.

More specifically, the circular profile of the guideways 21, 22 is such that, from the intermediate angular pivoting position of the arm 2, said position being shown in FIG. 5, these guideways cut off the potential path of the pegs 41, 42, in the event of the handle 4 being loaded, and prevent it from being in any way displaced from its stable end-of-travel position.

Furthermore, the invention makes provision for the pegs to be arranged between the pin 23a of the hinge 23 and the pin 40 of the handle 4, as illustrated, in particular, by FIG. 1.

In the embodiment of the invention illustrated by the figures, the inner guideway 21 has a greater radius than that of the outer guideway 22. The two guideways are separated in this case by a fillet 24, the curvature of which corresponds substantially to the cylindrical profile of the pegs 41, 42. In other embodiments that are not shown and because there is no contact at all between the pegs and the guideways, the intermediate space between the guideways can however be embodied by any other profile that would have a greater length than the length of the fillet 24.

The radius difference between the two functional surfaces of the guideways 21, 22 is greater than or equal to the diameter of the pegs 41, 42 plus the chosen clearance between the pegs and the guideways. The two guideways 21, 22 have to be realized so as to always have at least one peg facing a guideway (the concave inner guideway 21 being active first), while leaving the passage free for the possible second peg during the initial stop-releasing phase.

In the embodiment shown in the figures, the functional surface of each of the guideways 21, 22 is delimited in this case by the lateral wall of a rib 21a, 22a with an at least partially cylindrical profile and that extends around the periphery of the end of the arm 2. The leading edge of the inner guideway 21 is preferably beveled but does not participate in the kinematics of the mechanism.

According to another variant embodiment of the device of the invention, the pegs are borne, not by the handle itself, but by an intermediate part connected to the shaft of the handle.

According to yet another variant, the locking mechanism has a base that supports at least one guideway and the profile of which substantially conforms to the contours of the end of the arm to which this base is attached.

The angular travel of the arm 2 is shown between the end of the stops releasing (FIGS. 4 and 5) and the door 1 being fully open (FIG. 7). The length of the two guideways 21, 22 combined (or the length of the single guideway in the variant with a single peg) is greater than or equal to the angular travel of the arm 2 during the circular-translation phase.

Figure 9:
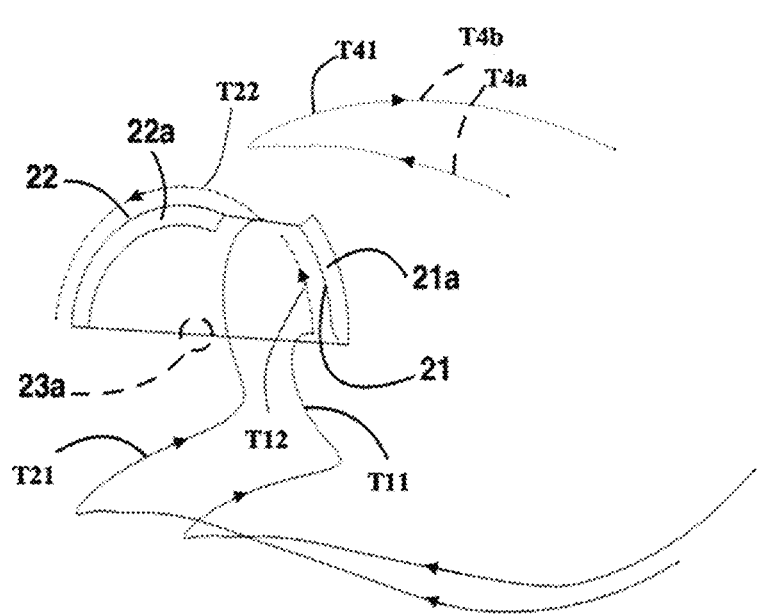
FIG. 9 shows a schematic top view of the kinematics of the mechanism for locking the door handle of the invention.

The kinematics of the relative displacement of the guideways 21, 22 of the arm 2 with respect to the pegs 41, 42 of the handle 4 maintained fixed with respect to the door are illustrated in plan view by FIG. 9. The door of the invention is opened in the following manner.

During the circular-translation phase of the door 1, the pegs 41, 42 describe, relative to the arm 2, circular paths T12, T22 centered on the pin 23a of the hinge between the arm 2 and the forearm 3. This phase is preceded by the stop-releasing phase. Thus, the handle 4 is turned first of all, in the horizontal plane, about its pin 40 from its rest position corresponding to the closure of the door (FIG. 3) to its end-of-travel position corresponding to the end of the stops releasing and therefore to the door 1 being unlocked. It is therefore the rotation alone of the handle 4 to its end-of-travel position that allows the stops to be released (position corresponding to FIG. 4).

The path T41 that is followed by the pin of the handle 40 during the stop-releasing phase is outlined in FIG. 9. During this phase, the pin 40 of the handle 4 describes portions of paths T4a and T4b corresponding to pivoting of the door. Then, during the circular-translation phase that follows, the pin of the handle 40 adopts a circular path (not shown) that is concentric to that of the pegs.

During the free pivoting of the arm 2 (FIGS. 5 and 6) throughout the circular translation of the door, the pegs 41, 42 thus remain facing their respective guideways 41, 42 after having followed the paths T11 and T21 illustrated in FIG. 9 during the rotation of the handle 4 until the end of the stop-releasing phase. In this last position, any rotation of the handle 4 is thus blocked while the door 1 initiates a circular translation path until it reaches its fully open position (FIG. 7).

The circular translation of the door 1 takes place only via pivoting about the pin between the arm 2 and its support (not shown) on the body of the fuselage (not shown) and a straightforward rotation between the arm 2 and the forearm 3 that remains fixed with respect to the door.

The pegs 41, 42 of the locking mechanism are placed on the handle 4 so as to be in their functional position only when the handle 4 has finished rotating. Throughout the releasing phase of the stops of the door, these pegs are therefore not used at all and they neither obstruct nor are obstructed by any surrounding part.

At the end of the rotation of the handle 4 and of the stop-releasing phase, when the door 1 is ready to start its circular translation, the pegs 41, 42 arrive in their final functional position but are still at a distance from the guideways 21, 22.

Thus, throughout the method for opening the door, the pegs 41, 42 and the guideways 21, 22 remain spaced apart by a determined minimum clearance and are therefore not in contact. The pegs come into abutment against the guideways only in the event of any forced, unexpected or accidental handling of the handle 4. In this configuration, all of the reaction forces are thus transferred to the connecting pin between the arm 2 and the forearm 3.

Although the mechanism of the invention has been described above with reference to the inner handle of the door, the result of the action of this mechanism is that the outer handle, when present (but which is not shown here in the figures), is also blocked along with the inner handle.

The invention claimed is:

1. An aircraft door (1) having laterally releasing stops and opens by circular translation, said door comprising:
   at least one actuating handle (4); and
   a mechanism for locking said handle (4),
   wherein said door is mounted in a frame (10) of the fuselage and includes on a first hand, with a maneuvering arm (2) mounted so as to pivot on the frame (10) and coupled, via a hinge (23), to a forearm (3) that is articulated via a first pin (30) on the door and, on a second hand, with a second pin (40) that allows said handle (4) to rotate, in a plane parallel to the pivoting plane of the arm, between a closed position of the door and an end-of-travel position corresponding to partial opening thereof after the stops have been released,
   wherein said locking mechanism having at least one peg (41, 42) borne by said handle (4) and at least one guideway (21, 22) that has a circular profile and is borne by a face of said arm (2), said face being arranged facing the peg and centered on said hinge (23), the peg and the guideway being relatively positioned such that, from the end-of-travel position of the handle (4) corresponding to the end of the stops releasing and during the circular translation of the door until it is fully open, the rotation of the handle is blocked by bearing contact of the peg (41, 42) against the guideway (21, 22), characterized in that the handle (4) bears a peg referred to as outer peg (42) and a peg referred to as inner peg (41), which are arranged laterally on either side of the handle and engaged, respectively, with a convex face of an outer guideway (22) and a concave face of an inner guideway (21), said guideways being borne by the arm (2),
   wherein the guideways (21, 22) are separated by a fillet (24), the fillet (24) having a curvature that corresponds to a curvature of the pegs (41, 42).

2. The door as claimed in claim 1, wherein the circular profile of the inner (21) and outer (22) guideways has a diameter that is within a range of values and, from the intermediate angular pivoting position of the arm (2), causes the potential path of the pegs (41, 42) to be cut off by the guideways (21, 22), in the event of an action applied to the handle (4).

3. The door as claimed in claim 1, wherein said pegs (41, 42) are arranged between the hinge (23) and the pin (40) of the handle (4).

4. The door as claimed in claim 1, wherein the functional surface of the guideways (21, 22) is delimited by a lateral wall of a rib (21a, 22a) with an at least partially cylindrical profile.

5. The door as claimed in claim 4, wherein said rib (21a, 22a) extends around the periphery of the end of the arm (2).

6. The door as claimed in claim 1, wherein the inner guideway (21) has a greater radius than that of the outer guideway (22).

7. The door as claimed in claim 4, wherein the radius difference between the two functional surfaces of the guideways (21, 22) is greater than or equal to a combined diameter of the pegs (41, 42), plus a combined clearance between the pegs and the guideways.

8. An aircraft door (1) having laterally releasing stops and opens by circular translation, said door comprising:
   at least one actuating handle (4); and
   a mechanism for locking said handle (4),
   wherein said door is mounted in a frame (10) of the fuselage and includes on a first hand, with a maneuvering arm (2) mounted so as to pivot on the frame (10) and coupled, via a hinge (23), to a forearm (3) that is articulated via a first pin (30) on the door and, on a second hand, with a second pin (40) that allows said handle (4) to rotate, in a plane parallel to the pivoting plane of the arm, between a closed position of the door and an end-of-travel position corresponding to partial opening thereof after the stops have been released,
   wherein said locking mechanism having at least one peg (41, 42) borne by said handle (4) and at least one guideway (21, 22) that has a circular profile and is borne by a face of said arm (2), said face being arranged facing the peg and centered on said hinge (23), the peg and the guideway being relatively positioned such that, from the end-of-travel position of the handle (4) corresponding to the end of the stops releasing and during the circular translation of the door until it is fully open, the rotation of the handle is blocked by bearing contact of the peg (41, 42) against the guideway (21, 22), characterized in that the handle (4) bears a peg referred to as outer peg (42) and a peg referred to as inner peg (41), which are arranged laterally on either side of the handle and engaged, respectively, with a convex face of an outer guideway (22) and a concave face of an inner guideway (21), said guideways being borne by the arm (2); and wherein an angular length of the two guideways combined is greater than or equal to an angular travel of the arm during the circular-translation phase of the door.

9. The door as claimed in claim 1, wherein said locking mechanism has a base that supports at least one guideway (21, 22) and the profile of which substantially conforms to the contours of the end of the arm (2) to which said base is intended to be attached.

10. An aircraft having at least one door (1) having laterally releasing stops as claimed in claim 1.

11. A method for reversibly opening an aircraft door (1) having laterally releasing stops as claimed in claim 1, wherein the handle (4) is turned about its pin (40) from its rest position corresponding to the closure of the door to its end-of-travel position corresponding to the end of the stop-releasing phase, then the arm (2) is pivoted in a plane parallel to that of the handle in order to provide the circular translation of the door until it reaches its fully open position, at least one pegs facing, during this pivoting, the guideways in order to block any rotation of the handle.

\*   \*   \*   \*   \*